(12) United States Patent
Haras et al.

(10) Patent No.: US 7,559,038 B2
(45) Date of Patent: Jul. 7, 2009

(54) METHOD FOR NAVIGATION THROUGH DISPLAYED MEDICAL IMAGE INFORMATION

(75) Inventors: Gabriel Haras, Mücke (DE); Ute Feuerlein, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 284 days.

(21) Appl. No.: 11/608,913

(22) Filed: Dec. 11, 2006

(65) Prior Publication Data

US 2007/0150841 A1    Jun. 28, 2007

(30) Foreign Application Priority Data

Dec. 23, 2005    (DE) ................ 10 2005 061 848

(51) Int. Cl.
*G06F 3/048*    (2006.01)

(52) U.S. Cl. .................................... 715/848

(58) Field of Classification Search ............... 715/730, 715/848, 849, 850
See application file for complete search history.

(56) References Cited

U.S. PATENT DOCUMENTS

| | | | |
|---|---|---|---|
| 6,341,179 B1 * | 1/2002 | Stoyle et al. ............ | 382/254 |
| 6,806,864 B2 | 10/2004 | Rahn et al. | |
| 6,990,637 B2 * | 1/2006 | Anthony et al. .......... | 715/851 |
| 2004/0130529 A1 | 7/2004 | Magara | |

* cited by examiner

*Primary Examiner*—Thanh T Vu
(74) *Attorney, Agent, or Firm*—Schiff Hardin LLP

(57) ABSTRACT

In a method for navigation through medical image information, upon selection of a second operating mode, slice images from different slices within a slice image set can be selected by a movement of a control device in the y-direction and slice images from further slice image sets acquired at different acquisition times can be selected by a movement in the x-direction.

6 Claims, 1 Drawing Sheet

METHOD FOR NAVIGATION THROUGH DISPLAYED MEDICAL IMAGE INFORMATION

BACKGROUND OF THE INVENTION

1. Field of the Invention

The present invention concerns a method for navigation through medical image information.

2. Description of the Prior Art

DE 199 58 443 C2 describes a control device for influencing a representation of medical image information. The medical image information is slice images that are graphically displayed as a component of a slice image stack reproducing the sequence of the slices in a z-direction. A radio control element that can move freely in space is provided for navigation. A movement of the radio control element in the x-y plane effects a corresponding movement of a pointer element on a screen. For navigation in the z-direction, i.e. relative to the sheets in the slice image stack, it is necessary to move the radio control element in the z-direction. The navigation within a slice image ensues by a movement of the radio control element in the x- and/or y-direction. The known radio control element requires a relatively high manufacturing expenditure. Its handling is intricate and requires practice.

Moreover, according to the prior art it is known to implement perfusion examinations by means of x-ray computed tomography. For this purpose, a contrast agent is administered to a patient. Slice image sequences of the region of the patient to be examined are subsequently acquired in a number of repetitions. Each slice image of a slice image sequence or of a slice image set is thereby provided with time information corresponding to the respective acquisition time.

Each slice image set can in turn be graphically displayed as a slice image stack on a screen A selection field inserted in the form of what is known as a "dog-ear" as well as scroll bars are provided at one corner of the slice image stack for selection of a specific slice image. A selection of such selection fields with a conventional computer mouse enables a paging through the slice image stack until the location of a sought slice image.

To response to specific diagnostic questions, it is necessary for the treating physician to observe the chronological change of the distribution of the contrast agent within a slice. According to the prior art, this requires to separately seeking out the slice images of the same slice from each slice image set. This requires a high time expenditure.

SUMMARY OF THE INVENTION

An object of the invention is to remedy the disadvantages according to the prior art. In particular, a method for navigation through medical image information should be specified that enables a fast and simple location of slice images corresponding to one another and acquired at different acquisition times.

The image information through which navigation is undertaken in accordance with the inventive method includes a number of slice image sets, with each slice image set containing multiple slice images respectively acquired in spatially successive slices, with the displayed information also including an indication of the tire interval in which the slice images were acquired. In accordance with the present invention, a control device that can be operated in a first operating mode and a second operating mode is used for movement of the pointer element on a screen. In a second operating mode, slice images from different slices can be selected via a movement of the control device in a first direction within a slice image set. By movement of the control device in a second direction running perpendicular to the first direction, slice images corresponding to a displayed slice image and acquired at different acquisition times can be selected from further slice image sets. This means that a movement of the control device in the first direction enables a navigation or a paging through the slice image stack in the z-direction. A movement in a second direction enables a navigation through the acquisition times within one and the same slice. This enables a fast location of a sought slice image and moreover the detection of a chronological change of the distribution of a contrast agent within the same slice. The inventive method can be implemented with conventional control devices that enable a 2-dimensional navigation. The use of a particular radio control device that is freely movable in space is not required.

In the sense of the present invention, a "slice image" means an image formed from a 2-dimensional or also a 3-dimensional data set. This means that the slice produced with the slice image can extend to a predetermined extent in the z-direction. The corresponding information can be made visible in the slice image, for example by means of a false-color representation, a three-dimensional representation or the like.

According to an embodiment of the invention, given a simultaneous movement of the control device in the first direction and the second direction in the second operating mode, slice images from different slices and from further slice image sets can be simultaneously selected. This means that a simultaneous navigation in the z-direction and through the acquisition times is possible given a movement of the control element effecting an angled movement of the pointer element. This enables a particularly fast location of a slice image of a specific slice acquired at a specific acquisition time.

According a further embodiment the second operating mode can be selected by pressing a button provided on the control device. The selection of the second operating mode appropriately ensues via holding down the button. This enables a fast termination of the navigation process.

The control device can be a computer mouse, a joystick or a trackball. Other control devices that, according to the prior art, are ordinarily available and relatively low-priced are also suitable for implementation of the inventive method.

The first axis is appropriately the y-axis of the image plane. In this case a movement of the control device causing a vertical movement of the pointer element in the first operating mode effects a paging through the slice image stack in the second operating mode. A movement of the control device in which a horizontal movement of the pointer element is effected in the image plane in the first operating mode enables a navigation through slice images with different acquisition times. Naturally it is also possible to interchange the axes. In this case the slice stack can be paged through by a movement of the control device effecting a horizontal movement in the first operating mode.

According to a further embodiment of the invention, a computer is provided with a computer program (i.e., a computer-readable medium encoded with a data structure) for implementation of the inventive method and with a control device interacting with the computer. The same variations discussed above can be achieved in embodiments of the computer program.

DESCRIPTION OF THE PREFERRED EMBODIMENTS

Figure 1:
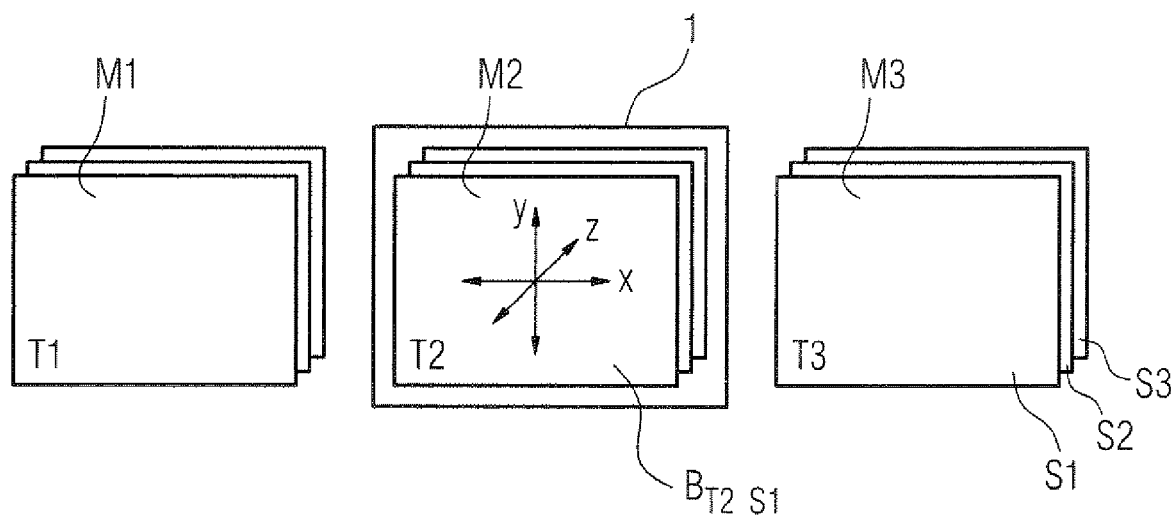
FIG. 1 schematically illustrates a mode of operation of the inventive method.

An exemplary execution of the inventive method is schematically shown in FIG. 1. A screen 1 has an image plane spanned by an x-axis and a y-axis. A first slice image $B_{T2S1}$ selected from a second slice image set M2 is displayed on the screen 1. The second slice image set M2 is part of a second data set that contains a number of files reproducing the slice images. The slice image $B_{T2S1}$ is graphically shown on the screen 1 as a component of a slice image stack symbolizing the slice images of the second slice image set M2. In addition to the second slice image set M2, the medical image information to be navigated through includes further slice image sets, for example a first slice image set M1 and a third slice image set M3. The first slice image set M1 and the third slice image set M3 also exist in the form of data sets. The slice image sets M1, M2, M3 have been respectively acquired in successive time intervals T1, T2, T3. Each section image B is provided with a slice index regarding its position (i.e. its association with one of the slices S1, S2, S3 in the slice image stack in the z-direction, and a time index corresponding to the respective time interval T1, T2, T3. The aforementioned slice and time indices stored with regard to each of the slice images B enable a fast location of the file corresponding to the sought slice image B as well as a display of the slice image B on the screen 1 in reaction to navigation commands generated with a control device.

Figure 2:
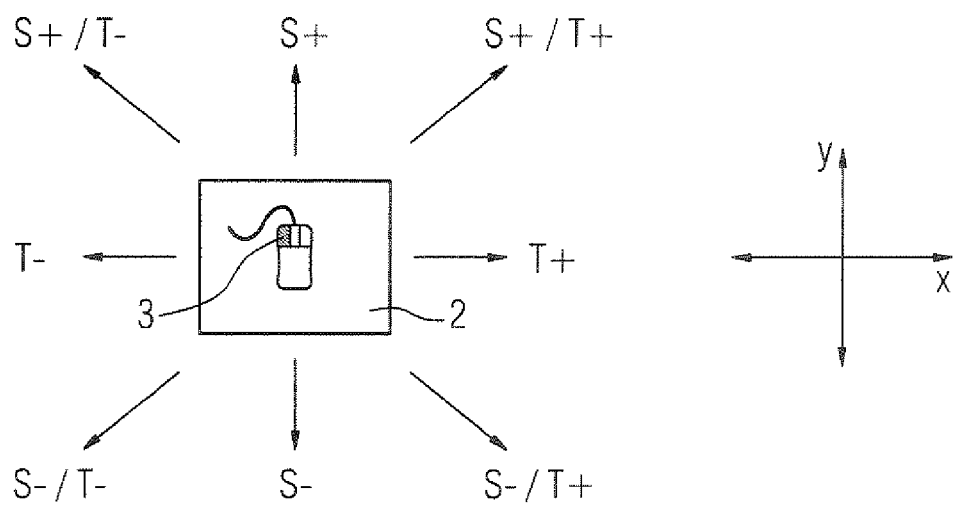
FIG. 2 shows an example of navigation using the computer mouse in accordance with the invention.

The navigation ensues, for example, as follows with the computer mouse 2 shown in FIG. 2:

Given a movement of the computer mouse 2 in a movement direction corresponding to the y-direction, in a first mode of operation a pointer element (not shown here) on the screen 1 likewise moves in the y-direction. Menu functions or the like can therewith be selected in a conventional manner. In the first operating mode a movement of the pointer element on the screen 1 in the x-direction can likewise be effected by a movement of the computer mouse 2 in a further movement direction perpendicular thereto. To select a second mode of operation of the computer mouse 2, a button 3 provided on this can be pressed. As long as the button 3 is pressed, the second mode of operation is activated. Given an activated second mode of operation, a movement of the computer mouse in the first movement direction effects a paging within the displayed slice image set M1, M2, or M3 through the slice images B stored with regard to the corresponding slices S1, S2, S3.

A selection of slice images B with increasing slice index thus can be effected by a movement of the pointer element toward an upper edge of the screen 1 and a selection of slice images B with decreasing slice index can be effected by a movement of the pointer element towards the lower edge of the screen 1.

A selection of slice images B that have been acquired at various acquisition times T1, T2, T3 can ensue in a similar manner by a movement of the pointer element in the x-direction within one and the same slice S1, S2, or S3. This enables, for example, an observation of the variation of the distribution of a contrast agent within a slice over time.

Given a movement of the pointer element in a direction that includes components of both the y-direction and the x-direction, a simultaneous navigation through the slice image sets M1, M2 and M3 and through the acquisition times is possible.

In place of a computer mouse 2, other control devices (for example a joystick, a trackball or the like) can naturally also be used. The control signals generated with these are transferred to a computer on which are stored the data sets corresponding to the respective slice image sets M1, M2, M3. A suitable computer program that enables the navigation described above upon activation of the second operating mode is provided on the computer for implementation of the inventive navigation.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for navigating through medical image information upon display of a portion of said medical information on a display screen in an image plane having a first axis and a second axis perpendicular to the first axis, said medical image information comprising a plurality of slice image sets each comprising multiple successively-acquired slice images acquired in a sequence, said slice image sets being respectively acquired during different time intervals and the respective slice images in the slice image sets corresponding to each other in position in said sequence from slice image set-to-slice image set, said method comprising the steps of:
   with a user-operable control device that moves a pointer element on said screen, selecting a first mode of operation and, in said first mode of operation, effecting a displacement movement of said pointer element to cause only one of said slice image sets to be displayed at said screen, as a currently-displayed slice image set, with the multiple slice images thereof shown in said sequence of acquisition along a direction appearing perpendicularly to said first axis and said second axis;
   via said control device, selecting a second mode of operation and, in said second mode, effecting a movement of the pointer element on the screen in a first direction parallel to the first axis to select one of said slice images in the currently-displayed slice image set for individual display at said screen; and
   in said second mode, effecting movement of said pointer element on said screen in a second direction parallel to said second axis to select the slice image, corresponding in position in said sequence to the individually displayed slice image of the currently-displayed slice image set, from one of the non-displayed plurality of slice image sets, for individual display at said screen together with said individually displayed slice image of said currently-displayed slice image set.

2. A method as claimed in claim 1 comprising, in said second mode of operation, effecting movement of said pointer element on said screen in a direction having components along both of said first direction and said second direction to simultaneously select a slice image in the currently-displayed set of slice images for individual display and said corresponding slice image in said one of said non-displayed slice image set.

3. A method as claimed in claim 1 comprising selecting said second mode of operating a depressible button at said control device.

4. A method as claimed in claim 1 comprising employing a device as said control device selected from the group consisting of a computer mouse, a joystick and a trackball.

5. A method as claimed in claim 1 wherein said first axis is the y-axis of the image plane.

6. A computer-readable medium encoded with a data structure, said medium being loadable into a computer for navigation through medical image information upon display of a portion of said medical information on a display screen of said computer in an image plane having a first axis and a second axis perpendicular to the first axis, said medical image information comprising a plurality of slice image sets each comprising multiple successively-acquired slice images acquired in a sequence, said slice image sets being respectively acquired during different time intervals and the respective slice images in the slice image sets corresponding to each other in position in said sequence from slice image set-to-slice image set, said data structure causing said computer to:

respond to movement of a user-operable control device that moves a pointer element on said screen to select a first mode of operation and, in said first mode of operation, respond to a displacement movement of said pointer element to cause only one of said slice image sets to be displayed at said screen, as a currently-displayed slice image set, with the multiple slice images thereof shown in said sequence of acquisition along the z-direction;

respond to said control device to select a second mode of operation and, in said second mode, respond to a movement of the pointer element on the screen in a first direction parallel to the first axis to select one of said slice images in the currently-displayed slice image set for individual display at said screen; and in said second operating mode, respond to movement of said pointer element on said screen in a second direction parallel to said second axis to select the slice image, corresponding in position in said sequence, to the individually displayed slice image of the currently-displayed slice image set, from one of the non-displayed plurality of slice image sets, for individual display at said screen together with said individually displayed slice image of said currently-displayed slice image set.

\* \* \* \* \*